(12) United States Patent
Bahari Molla Mahaleh et al.

(10) Patent No.: US 8,110,173 B2
(45) Date of Patent: Feb. 7, 2012

(54) FABRICATION OF NIO NANOPARTICLES AND CHIP-LIKE NANOFLAKES BY SOLVOTHERMAL TECHNIQUE

(76) Inventors: Yaser Bahari Molla Mahaleh, Tehran (IR); Seyed Khatibol Eslam Sadrnezhad, Tehran (IR); Davood Hosseini, Tehran (IR)

( * ) Notice: Subject to any disclaimer, the term of this patent is extended or adjusted under 35 U.S.C. 154(b) by 31 days.

(21) Appl. No.: 12/554,877

(22) Filed: Sep. 5, 2009

(65) Prior Publication Data
US 2009/0324486 A1 Dec. 31, 2009

(51) Int. Cl.
*C01G 51/02* (2006.01)
(52) U.S. Cl. .................................................. 423/594.19
(58) Field of Classification Search ............. 423/594.19; 977/811
See application file for complete search history.

(56) References Cited

U.S. PATENT DOCUMENTS
2008/0019901 A1 * 1/2008 Shen et al. ............... 423/594.19
* cited by examiner

*Primary Examiner* — Stuart Hendrickson
*Assistant Examiner* — Richard M Rump
(74) *Attorney, Agent, or Firm* — Barry Choobin; Choobin & Choobin Consultancy

(57) ABSTRACT

A method is disclosed for fabrication of NiO nanoparticles and NiO chip-like nanoflakes by solvothermal technique. Mixed organic alcohols were used as solvent to make a homogenous solution from a nickel containing salt (or complex) for production of NiO nanoparticles and chip-like nanoflakes. The solution was heated in a sealed flask sitting inside a warm furnace. The precipitate was filtered, rinsed, dried and calcined to produce nanoparticles or nanoflakes. The size of the particles was controllable by heating time and temperature. Similar procedures were used for production of both nanostructures except hydrogen peroxide addition to the initial solution for NiO chip-like nanoflakes fabrication.

6 Claims, 9 Drawing Sheets

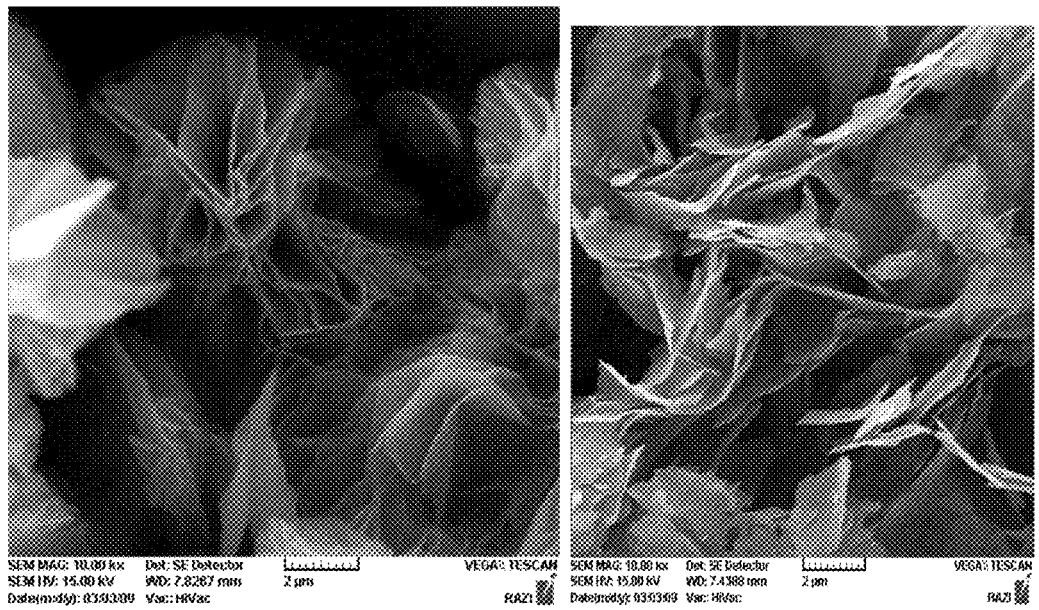
Fig. 5 a
Fig. 5 b
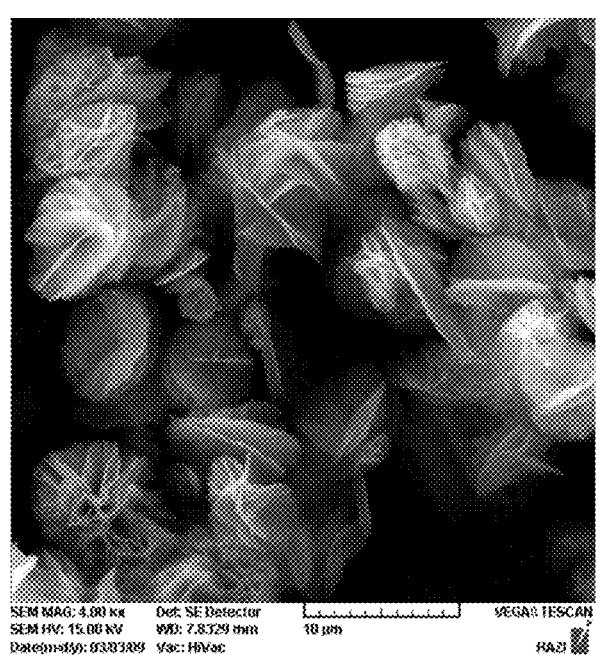
Fig. 5 c

FABRICATION OF NIO NANOPARTICLES AND CHIP-LIKE NANOFLAKES BY SOLVOTHERMAL TECHNIQUE

INTERNATIONAL FILING SPONSORSHIP STATEMENT

The present invention is sponsored by Iranian National Science foundation and Iranian Nanotechnology initiative Council.

FIELD OF THE INVENTION

This invention introduces a method for making nanoparticles of Nickel Oxide. The invention also pertains to a novel high surface catalytic chip-like nanostructure of nickel oxide. The invention also pertains to a method of making such novel structure.

BACKGROUND OF THE INVENTION

Metal oxides are attractively applied in catalysis, energy storage, energy conversion, electronics, sensing, optics and functional devices. Nanostructured particles have engrossed both scientific and industrial practitioners due to their outstanding physical and chemical properties as well as their fascinating behavior. Excellent properties of nanoparticles are largely due to their large surface area to volume ratio, unusual adsorptive properties, surface defects and great diffusion coefficients.

Nanoscience research has so far been mostly related to development and synthesis of nanopowders and nanostructures. Powder synthesis with size, shape and size-distribution control has been a major part of colloid chemistry for decades. Compared to other methods of synthesizing metal oxides, liquid-phase routes (like sol-gel) have shown advantages like low-temperature requirement, metastable phase formation, morphology-control option and superior homogeneous composition attainment. Nickel oxide (NiO) usually considered as a model of p-type material—is a very promising semiconductor with wide band gap of 3.6-4.0 eV. It has attracted vast number of researchers because of its chemical stability, excellent and unique electrical, optical and magnetic properties, outstanding catalysis effect, gas sensing, chemical sensing (particularly as a negative electrode in Li-ion batteries and fuel cells), electrochromic behavior and magnetic and electrochemical super-capacitance.

Nickel oxide (NiO) has, in particular, behaved excellent when used as a catalyzer. Nanocrystalline NiO is expected to possess improved properties when compared to micrometer-sized NiO particles due to the volume effect, the quantum size effect, the surface effect and the macroscopic quantum tunneling effect.

There are several precipitation methods which exhibit simplicity, high yield and easy particle-size control. Research activities for synthesis of NiO nanoparticles via sol-gel, microemulsion precipitation, chemical vapor deposition and sputtering have progressed during past decade Specific surface area of a nano-NiO catalyst is much bigger than that of the conventional nickel-based (micro-NiO) catalysts. Nano-NiO particles, in particular, can be loaded on the surface of lower-cost carriers for saving purposes. It is expected, thus, that the nano-NiO catalyst can enhance the performance of biomass gasification/pyrolysis due to its higher activity.

Organic components and organic reaction pathways play a fundamental role in the nonaqueous synthesis of inorganic nanomaterials. A simple way to circumvent many problems of aqueous chemistry is to perform the synthesis procedure in organic solvents under exclusion of water. To enhance the performance of NiO for more important applications, the conditions of synthesis must be well-controlled to obtain ultra fine powders with a narrow particle-size distribution.

Solvent-directed processes involve the reaction of metal oxide precursor(s) with a common organic solvent and usually take place at lower temperatures (50-250° C.). Small number of reactants (precursor and solvent) makes it possible to study the chemical mechanisms involved in metal oxide formation through the characterization of the organic by-products. Homogeneous precipitation method is one of the economically feasible processes to prepare monodispersed metal oxide particles of various shapes and sizes.

SUMMARY OF THE INVENTION

The present invention presents a method for fabrication of NiO nanoparticles and NiO chip-like nanoflakes by solvothermal technique. Mixed organic alcohols were used as solvent to make a homogenous solution from a nickel containing salt (or complex) for production of NiO nanoparticles and chip-like nanoflakes. The solution was heated in a sealed flask sitting inside a warm furnace. The precipitate was filtered, rinsed, dried and calcined to produce nanoparticles or nanoflakes. The size of the particles was controllable by heating time and temperature. Similar procedures were used for production of both nanostructures except hydrogen peroxide addition to the initial solution for NiO chip-like nanoflakes fabrication.

Preparation of NiO nanostructure is a major effort since it has a lot of applications such as in catalyst, gas sensor, a negative electrode in Li-ion batteries and fuel cells, electrochromic films, magnetic materials and electrochemical super capacitors. In most cases, producing a large surface could help to achieve better results. In the present invention, two kinds of NiO nanostructures are introduced: (1) Fabrication of nanoparticles of NiO and (2) production of chip-like NiO flakes having nanometric thickness. Both have a large catalytic surface but NiO nanochips have much better surfaces. Main procedures in fabrication of these structures are as follow: choosing a suitable nickel salt or nickel complex ($NiCO_3.2Ni(OH)_2.4H_2O$) for NiO nanoparticles or $Ni(acac)_2$ for NiO nanochips), solving in a suitable solvent such as benzyl alcohol mixed with 1-hexanol, and placing the solution in a Teflon lined flask in a furnace for 12-24 h at temperatures ~150-190° C. Filtering the green precipitate, drying at 50-80° C. for 12-24 h and finally calcining at 350-500° C. for 1-4 h. Hydrogen peroxide must be added for making nanochip-like NiO in the making-solution stage.

It is a feature of an embodiment of the present invention to provide a method for fabrication of NiO nanoparticles/NiO chip-like nanoflakes comprising;
(a) Dissolving a nickel salt in at least one organic solvent;
(b) Forming a homogenous nickel-organic solution complex;
(c) Placing said homogenous nickel-organic solution complex in a container;
(d) Heating said homogenous nickel-organic solution complex at a predetermined temperature for a predetermined period of time, wherein said nickel-organic solution complex decomposes and leaves a predetermined amount of residuals; and filtering, rinsing, air-drying and calcining said predetermined amount of residuals to obtain said NiO nanoparticles.

It is yet another feature of an embodiment of the present invention to provide nickel salt which is $NiCO_3.2Ni(OH)_2.4H_2O$.

It is yet another feature of an embodiment of the present invention to provide at least one organic solvent which is benzyl alcohol and/or 1-hexanol.

It is yet another feature of an embodiment of the present invention to provide a method in which the heating temperature and time are 150-200° C. and 12-48 h respectively.

It is yet another feature of an embodiment of the present invention to provide a method of fabrication of NiO nanoparticles, wherein the calcining comprises of calcination temperature and time of 300-500° C. and 1-8 h, respectively.

It is yet another feature of an embodiment of the present invention to provide a method, wherein said method further comprises step of: adding a predetermined amount of hydrogen peroxide.

It is yet another feature of an embodiment of the present invention to provide a method, wherein said nickel salt is nickel acetyl acetonate.

It is yet another feature of an embodiment of the present invention to provide a method, wherein said at least one organic solvent is benzyl alcohol and/or 1-hexanol.

It is yet another feature of an embodiment of the present invention to provide a method, wherein the heating temperature and time are 150-200° C. and 12-48 h respectively.

It is yet another feature of an embodiment of the present invention to provide a method, wherein the calcining comprises of calcination temperature and time of 300-500° C. and 1-8 h, respectivel.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 5 (a-c) is a scanning electron microscopy (SEM) image of nanochip-like nickel oxide after the calcination of green filtered precipitate in air at 350° C.

DESCRIPTION OF PREFERRED EMBODIMENTS

In the present work, two types of nickel oxides are fabricated. First, nickel oxide nanoparticles and second nickel oxide chip-like nanoflakes. For making nickel oxide nanoparticles, procedures are as described below:

A salt of nickel like $NiCO_3.2Ni(OH)_2.4H_2O$ was used as nickel source. First, 1.0 gr of nickel salt dissolved in an organic solvent including 50 cc benzyl alcohol and 10 cc 1-hexanol and stirred magnetically until a homogenous solution prepared. During the stirring the temperature of solution gradually increased to about 70° C. Then, the homogenous solution placed in Teflon lined autoclave, sealed carefully and placed in a furnace which was preheated up to 190° C. The autoclave was kept in the furnace for about 12-24 h in 190° C. Then, autoclave was pulled out of the furnace and cooled down naturally in air. Next, the green precipitate was filtered and 5 times rinsed with absolute ethanol and dried in oven at 60° C. for 24 h. Finally, the dried powder was calcined at 350° C. for about 1 h. The product of this procedure was nickel oxide nanopowder. For making nickel oxide chip-like nanoflakes, the following procedures was done: A nickel complex such as Ni(ac ac)2 was used as nickel source. First, 1.0 gr of nickel complex was dissolved in an organic solvent including 10 cc benzyl alcohol and 40 cc 1-hexanol while being stirred magnetically until a homogenous solution was prepared. Then, a desired amount of hydrogen peroxide was added. During the stirring, the temperature of the solution gradually increased up to about 70° C. Afterwards, the homogenous solution was placed in a Teflon lined autoclave, sealed carefully and placed in a furnace which was preheated up to 190° C. The autoclave was kept in the furnace for about 12-24 h at 190° C. Then, autoclave was pulled out of the furnace and was cooled down naturally in air. Next, the green precipitate was filtered and rinsed with absolute ethanol for 5 times and dried in oven in 50° C. for 12-24 h. Finally, the dried powder was calcined in 350° C. for about 1 h.

Characterization

Properties of the products were characterized by x-ray diffraction (XRD), thermo-gravimetric (TG) method, Braunauer-Emmett-Teller (BET) analysis, scanning electron microscopy (SEM) and transmission electron microscopy (TEM).

Results and Discussion

Figure 1:
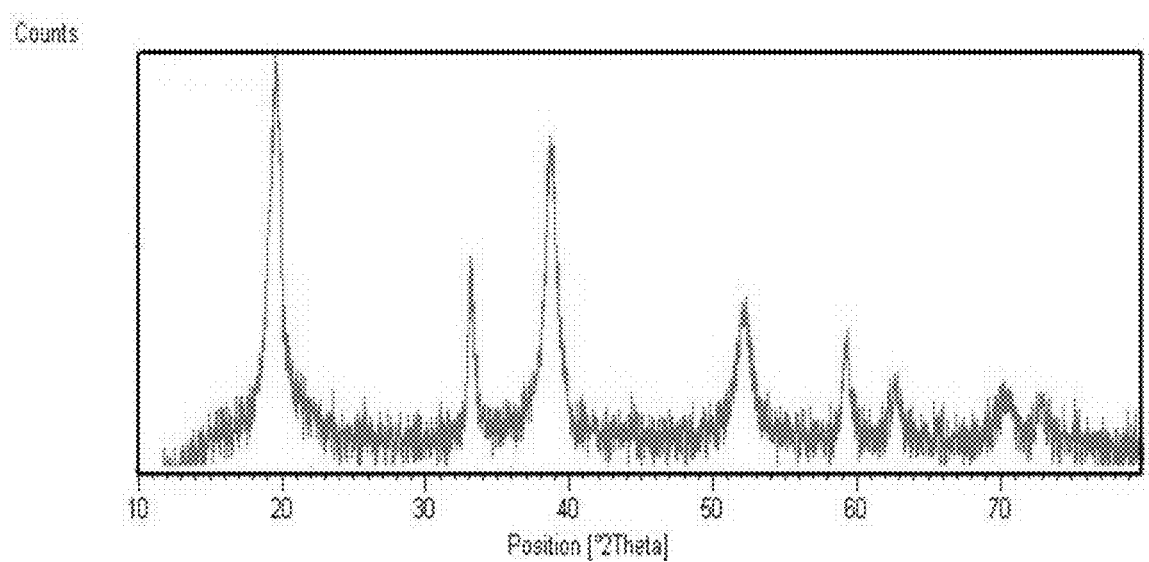
FIG. 1 introduces the X-ray diffraction (XRD) of the green filtered precipitate of nanochip-like nickel oxide.
Figure 2:
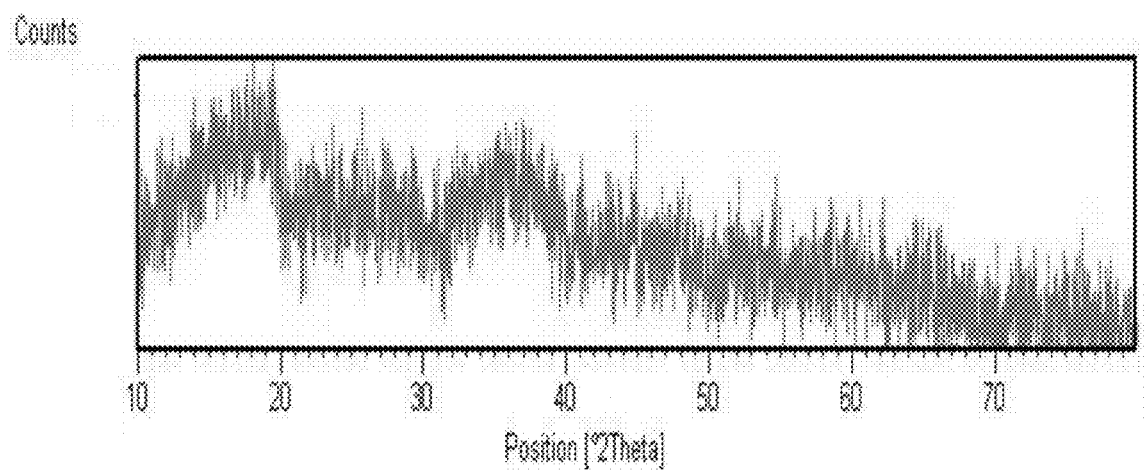
FIG. 2 introduces the XRD of the green filtered precipitate of nickel oxide nanoparticles.
Figure 3:
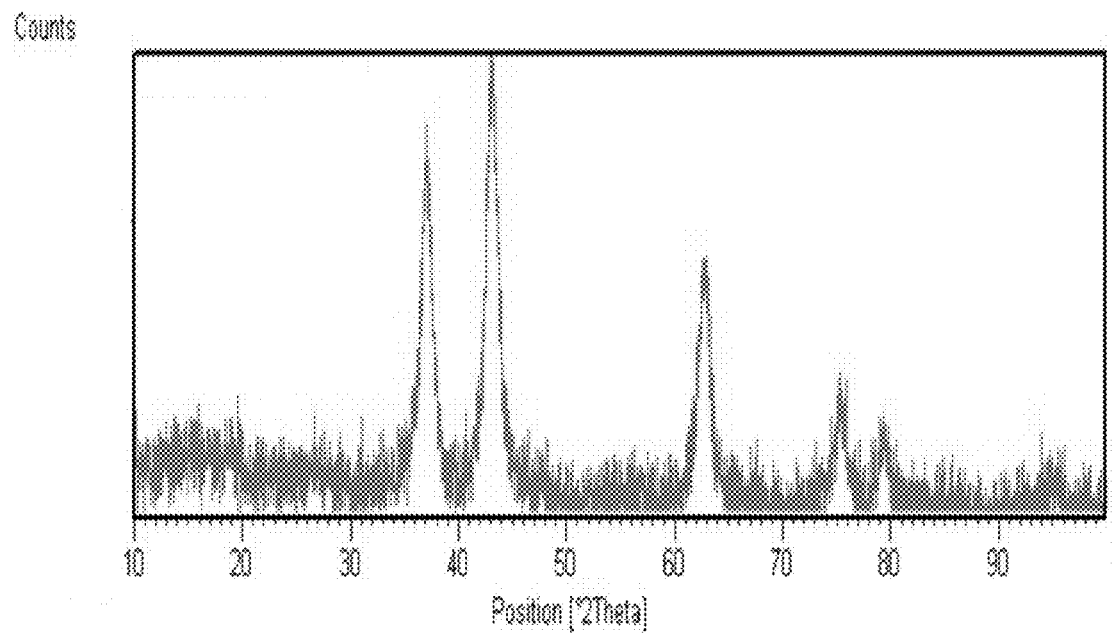
FIG. 3 shows the XRD pattern for the both products (nickel oxide nanoparticles and nanochip-like nickel oxide) after calcination of the green filtered precipitate in air.

In FIG. 1, the XRD diagram of the green filtered precipitate of the chip-like nanoflakes is represented. Comparing to XRD standard table, the diffraction peaks of FIG. 1 are similar to the diffraction peaks of Ni(OH)2.H2O indicating the presence of the nickel hydroxide. Major crystallographic planes in this XRD pattern (FIG. 1) are (001), (100), (101), (102), (110) and (111). The XRD pattern of green filtered precipitate of the nickel nanoparticles is represented in FIG. 2. In FIG. 2, no major diffraction peaks can be observed. This pattern offers the presence of an amorphous nickel complex. FIG. 3 indicates the XRD pattern for both products (NiO nanoparticles and nanochip-like NiO) after calcination of the green filtered precipitate in air. XRD calcined product pattern (FIG. 3) appeared crystallographic planes such as (111), (200) and (220), which indicated NiO crystallization and elimination of the former phase (nickel hydroxide or amorphous nickel complex).

Figure 4:
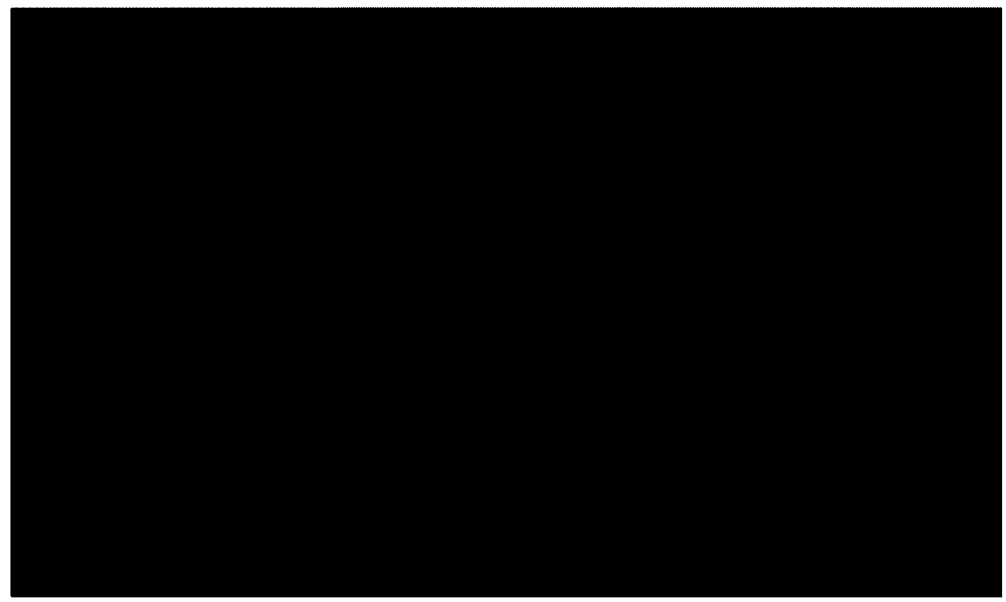
FIG. 4 presents thermo gravimetric (TG) diagram obtained at rate of 5 degree/min at temperatures increasing from room temperature to 700° C.

FIG. 4 shows thermogravimetric (TG) diagram for the green filtered precipitate. The sample heated by a speed of 5 degree/min from room temperature up to 700° C. The TG diagram shows a significant weight loss before 300° C. because of calcination of structural water. The structural water which has band structure with nickel and oxygen atoms inside the molecule will be eliminated before 300° C. This phenomenon can lead to pure NiO nanoparticles (nanostructure). After that event, the molecule will be stable with nearly a constant weight (without any subsequent weight-loss effect).

FIG. 5 is a SEM image of nanochip-like nickel oxide after the calcination of green filtered precipitate. It is clear that ultra uniform structure of very fine sheets with good distribution is obtained. These sheets can be used as a catalytic material having large surface to volume ratio. Based on BET results, these novel structures have a surface more than 60 m2/gr which may be equivalent to that of 20 nm spherical particles.

Figure 6:
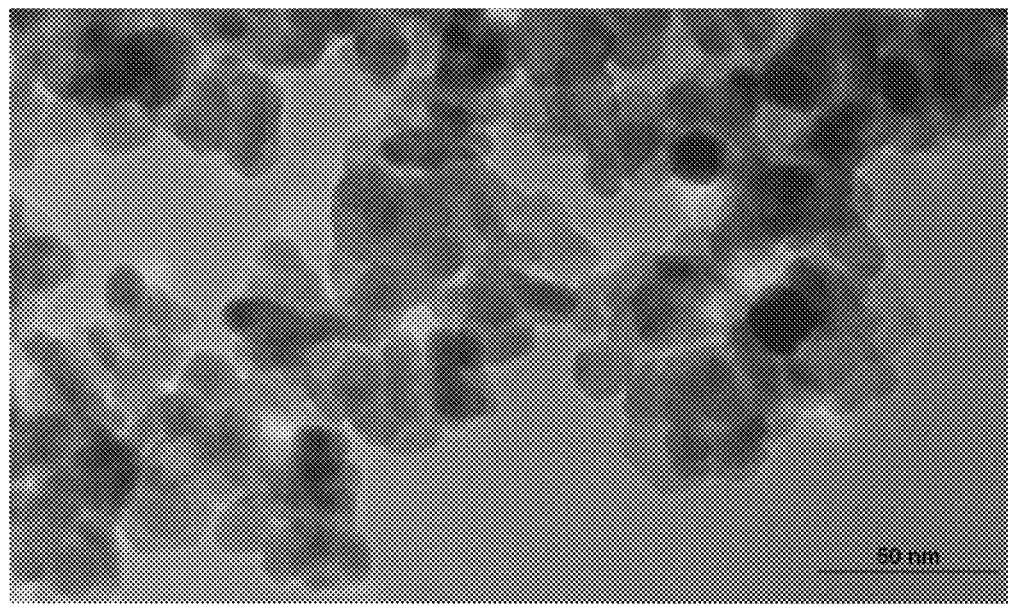
FIG. 6 is a transmission electron microscopy (TEM) image of nickel oxide nanoparticles after the calcination of green filtered precipitate in air at 350° C.

FIG. 6 shows the TEM image of nickel oxide nanoparticles after the calcination of green filtered precipitate. It is obvious that fine particles of about 20 nm are obtained. BET analysis shows a surface of ~34 m2/gr.

Figure 7:
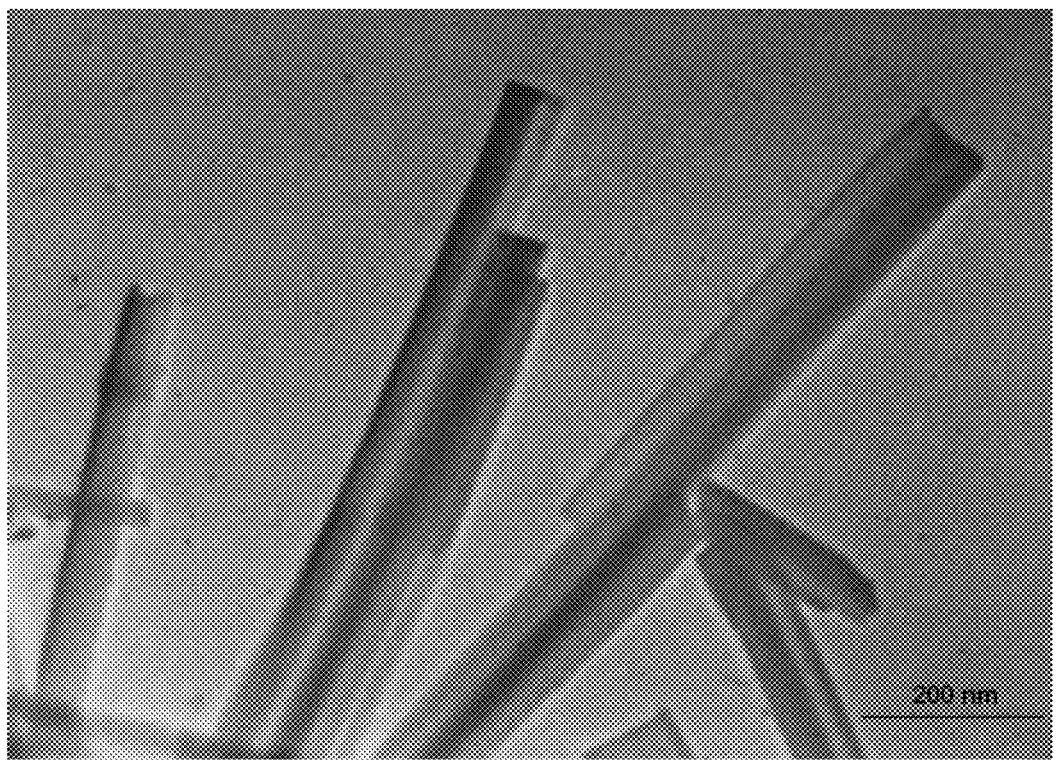
FIG. 7 is a transmission electron microscopy (TEM) image of nanochip-like nickel oxide after the calcination of green filtered precipitate in air at 350° C.
Figure 8:
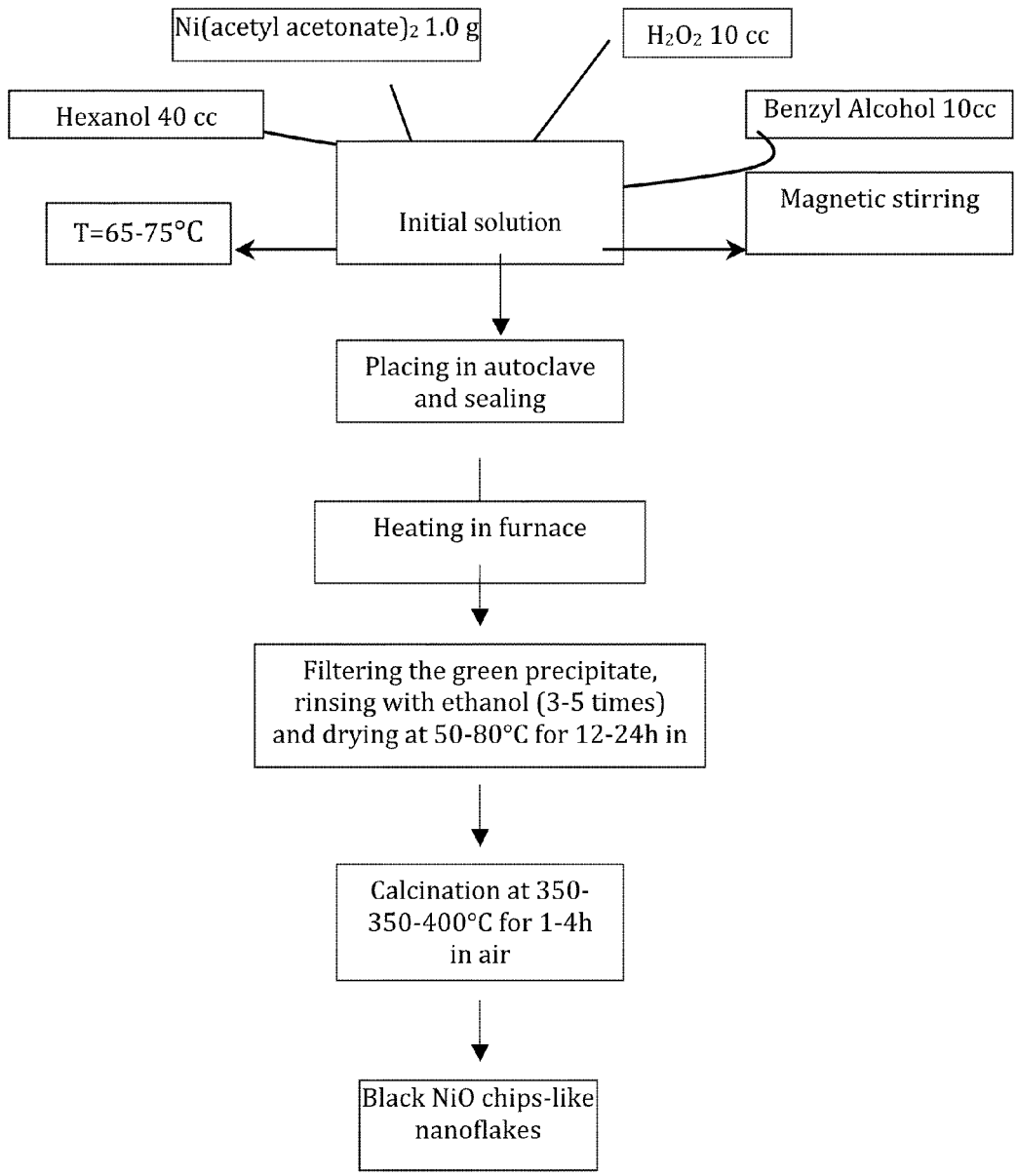
FIG. 8 is a flow diagram for making nanochip-like nickel oxide.
Figure 9:
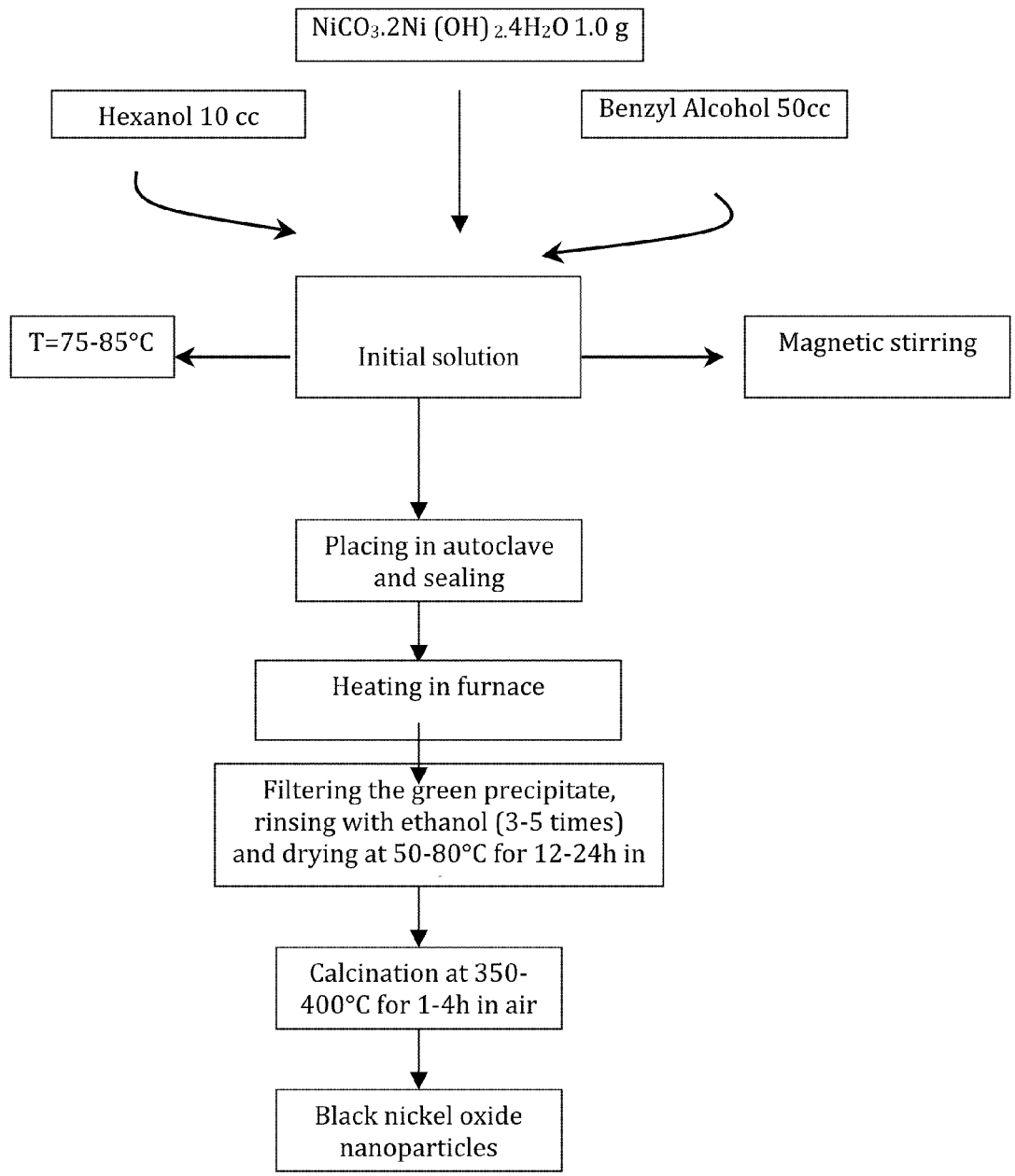
FIG. 9 is a flow diagram for making nickel oxide nanoparticles.

FIG. 7 is a TEM image of nanochip-like nickel oxide after the calcination of green filtered precipitate that shows nanochips with thicknesses less than 70 nm.

Two types of nano nickel oxides are, therefore, presented in this invention: spherical nanoparticles and nanometric chips. Both can present great catalytic effects; but nanochip-like samples introduce much better surfaces.

It is noted that the foregoing examples have been provided merely for the purpose of explanation and are in no way to be construed as limiting of the present invention. While the present invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed is:

1. A method for fabrication of NiO nanoparticles comprising:
    (a) dissolving a nickel salt in at least one organic solvent, wherein said nickel salt is $NiCO_3 \cdot 2Ni(OH)_2 \cdot 4H_2O$, and said at least one organic solvent is benzyl alcohol and/or 1-hexanol;
    (b) forming a homogenous nickel-organic solution complex;
    (c) placing said homogenous nickel-organic solution complex in a container;
    d) heating said homogenous nickel-organic solution complex for a period of time, wherein said nickel-organic solution complex decomposes and leaves residuals; and
    (e) filtering, rinsing, air-drying and calcining said residuals to obtain said NiO nanoparticles.

2. The method as claimed in claim 1, wherein the heating temperature is 150-200.degree. C., and said period of time is 12-48 h.

3. The method as claimed in claim 1, wherein the calcining comprises of calcination temperature and time of 300-500.degree. C., and 1-8 h, respectively.

4. The method as claimed in claim 1, wherein said method further comprises step of: adding hydrogen peroxide.

5. The method as claimed in claim 4, wherein the heating temperature is 150-200.degree. C., and said period of time is 12-48 h.

6. The method as claimed in claim 4, wherein the calcining comprises of calcination temperature and time of 300-500.degree. C., and 1-8 h, respectively.

* * * * *